(12) United States Patent
Agiwal et al.

(10) Patent No.: US 11,206,578 B2
(45) Date of Patent: Dec. 21, 2021

(54) METHOD AND APPARATUS FOR HANDLING COLLISIONS IN NEXT GENERATION COMMUNICATION SYSTEM

(71) Applicant: Samsung Electronics Co., Ltd., Suwon-si (KR)

(72) Inventors: Anil Agiwal, Suwon-si (KR); Hyunseok Ryu, Yongin-si (KR); Peng Xue, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/660,203

(22) Filed: Jul. 26, 2017

(65) Prior Publication Data

US 2018/0035332 A1 Feb. 1, 2018

Related U.S. Application Data

(60) Provisional application No. 62/368,369, filed on Jul. 29, 2016.

(51) Int. Cl.
*H04W 28/16* (2009.01)
*H04W 74/08* (2009.01)
(Continued)

(52) U.S. Cl.
CPC ........... *H04W 28/16* (2013.01); *H04J 11/003* (2013.01); *H04L 5/0037* (2013.01);
(Continued)

(58) Field of Classification Search
CPC ............. H04W 28/16; H04W 72/1247; H04W 74/085; H04W 74/0858; H04W 72/1289;
(Continued)

(56) References Cited

U.S. PATENT DOCUMENTS 10,524,255 B2\* 12/2019 Yi .......................... H04L 5/0092
2006/0227852 A1\* 10/2006 Black ...................... H04B 1/715
375/133

(Continued)

FOREIGN PATENT DOCUMENTS

WO 2016/092492 A1 6/2016
WO 2018/017802 A1 1/2018

OTHER PUBLICATIONS

Qualcomm, 3GPP TSG RAN WG1 Meeting #85, Nanjing, China, May 23-27, 2016 (Year: 2016).\*

(Continued)

*Primary Examiner* — Hassan A Phillips
*Assistant Examiner* — Mohammed S Chowdhury
(74) *Attorney, Agent, or Firm* — Jefferson IP Law, LLP

(57) ABSTRACT

A communication method and a system for converging a 5th-Generation (5G) communication system for supporting higher data rates beyond a 4th-Generation (4G) system with a technology for Internet of Things (IoT) are provided. The system may be applied to intelligent services based on the 5G communication technology and the IoT-related technology, such as smart home, smart building, smart city, smart car, connected car, health care, digital education, smart retail, security and safety services. The method includes receiving, from a base station, scheduling information for a first uplink packet transmission in a first time slot, determining whether the first uplink packet transmission in the first time slot is restricted based on information corresponding to a second uplink packet transmission in the first time slot of another terminal, and if the first uplink packet transmission in the first time slot is restricted, skipping the first uplink packet transmission in a first time slot.

16 Claims, 16 Drawing Sheets

(51) Int. Cl.
*H04L 5/00* (2006.01)
*H04W 72/12* (2009.01)
*H04J 11/00* (2006.01)
*H04B 7/0426* (2017.01)
*H04B 7/0452* (2017.01)
*H04L 27/152* (2006.01)

(52) U.S. Cl.
CPC ....... *H04L 5/0064* (2013.01); *H04W 72/1247* (2013.01); *H04W 74/085* (2013.01); *H04W 74/0858* (2013.01); *H04B 7/043* (2013.01); *H04B 7/0452* (2013.01); *H04L 5/0007* (2013.01); *H04L 5/0044* (2013.01); *H04L 27/1525* (2013.01); *H04W 72/1289* (2013.01)

(58) Field of Classification Search
CPC . H04W 72/1268; H04J 11/003; H04L 5/0037; H04L 5/0064; H04L 27/1525; H04L 5/0007; H04L 5/0044; H04B 7/0452; H04B 7/043
USPC .......................................................... 370/330
See application file for complete search history.

(56) References Cited

U.S. PATENT DOCUMENTS

| | | | |
|---|---|---|---|
| 2009/0103440 A1 | 4/2009 | Wang et al. | |
| 2015/0280871 A1* | 10/2015 | Xu | H04W 72/0446 370/330 |
| 2015/0334685 A1 | 11/2015 | Ji et al. | |
| 2016/0029416 A1* | 1/2016 | Ahn | H04W 72/1257 370/329 |
| 2016/0066342 A1 | 3/2016 | Ma et al. | |
| 2016/0095105 A1* | 3/2016 | Chen | H04W 72/0413 370/329 |
| 2016/0095137 A1* | 3/2016 | Chen | H04L 5/0007 370/329 |
| 2016/0174238 A1* | 6/2016 | Chen | H04L 5/0048 370/336 |
| 2016/0174259 A1 | 6/2016 | Mukherjee et al. | |
| 2016/0295584 A1* | 10/2016 | Chen | H04W 72/0446 |
| 2017/0332370 A1* | 11/2017 | Rico Alvarino | H04W 52/48 |
| 2017/0367110 A1* | 12/2017 | Li | H04W 4/70 |
| 2018/0027576 A1* | 1/2018 | Kowalski | H04W 72/0446 370/329 |
| 2019/0075582 A1* | 3/2019 | Kim | H04W 72/12 |
| 2019/0098608 A1* | 3/2019 | Yi | H04L 5/0044 |
| 2019/0141696 A1* | 5/2019 | Kim | H04L 5/0055 |
| 2019/0165906 A1* | 5/2019 | Bala | H04L 5/0091 |
| 2019/0191443 A1* | 6/2019 | Sano | H04W 72/10 |
| 2020/0008216 A1* | 1/2020 | Iyer | H04W 72/04 |
| 2020/0077470 A1* | 3/2020 | Xiong | H04L 1/1854 |
| 2020/0119895 A1* | 4/2020 | Choi | H04W 76/27 |

OTHER PUBLICATIONS

3GPP TSG RAN WG1 Meeting #85; R1-164446; Nanjing, China May 23-27, 2016;Source: Qualcomm Incorporated; Title: Collision handling. (Year: 2016).*

3GPP TSG-RAN WG1 #85; R1-165381; Nanjing, P.R. China, May 23-27, 2016; Source: Nokia, Alcatel-Lucent Shanghai Bell ; Title: Punctured Scheduling for Low Latency Transmissions. (Year: 2016).*

Qualcomm Incorporated, 'Collision handling', R1-164446, 3GPP TSG RAN WG1 Meeting #85, May 14, 2016.

Nokia et al.; Punctured Scheduling for Low Latency Transmissions; 3GPP TSG-RAN WG1 #85; R1-165381; May 23-27, 2016; Nanjing, P.R. China.

European Search Report dated May 28, 2019; European Appln. No. 17834775.3-1219 / 3476169; PCT/KR2017008068.

European Office Action dated Dec. 1, 2020, issued in European Application No. 17 834 775.3.

* cited by examiner

METHOD AND APPARATUS FOR HANDLING COLLISIONS IN NEXT GENERATION COMMUNICATION SYSTEM

CROSS-REFERENCE TO RELATED APPLICATION(S)

This application claims the benefit under 35 U.S.C. § 119(e) of a U.S. provisional patent application filed on Jul. 29, 2016 in the U.S. Patent and Trademark Office and assigned Ser. No. 62/368,369, the entire disclosure of which is hereby incorporated by reference.

TECHNICAL FIELD

The present disclosure relates to a method and an apparatus for handling collisions in next generation communication system. More particularly, the present disclosure relates to a method and an apparatus for channel quality measurement and terminal signal transmission based on coexistence between different systems based on cellular communication using licensed shared bands.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System.'

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched. Such an IoT environment may provide intelligent internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

Compared to existing 4G systems, 5G systems are expected to support more diversified services. For example, representative services may include enhanced mobile broad band (eMBB), ultra-reliable and low latency communication (URLLC), massive machine type communication (mMTC), and evolved multimedia broadcast/multicast service (eM-BMS). A system providing URLLC services may be referred to as a URLLC system, a system providing eMBB services may be referred to as an eMMB system, and a system providing mMTC services may be referred to as an mMTC system. The words "service" and "system" may be used interchangeably.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of handling packet collisions in next generation communication system.

Another aspect of the present disclosure is to provide a method and an apparatus for channel quality measurement and terminal signal transmission based on coexistence between different systems based on cellular communication using licensed shared bands.

In accordance with an aspect of the present disclosure, a communication method of a terminal is provided. The method includes receiving, from a base station, scheduling information for a first uplink packet transmission in a first time slot, determining whether the first uplink packet transmission in the first time slot is restricted based on information corresponding to a second uplink packet transmission in the first time slot of another terminal, and if the first uplink packet transmission in the first time slot is restricted, skipping the first uplink packet transmission in a first time slot.

In the method, further comprises receiving, from the base station, the information corresponding to the second uplink packet transmission in the first time slot of the other terminal in a second time slot preceding the first time slot.

In the method, the information corresponding to the second uplink packet transmission in the first time slot of the other terminal comprises indication indicating the terminal to skip the first uplink packet transmission in the first time slot.

In the method, wherein the information corresponding to the second uplink packet transmission in the first time slot of the other terminal comprises information indicating that the first time slot is scheduled for the second uplink packet transmission of the other terminal.

In accordance with an aspect of the present disclosure, a communication method of a base station is provided. The method includes transmitting, to a first terminal, first scheduling information for a first uplink packet transmission in a first time slot, transmitting, to a second terminal, second scheduling information for a second uplink packet transmission in the first time slot, determining whether the first uplink packet transmission in the first time slot is restricted based on the second scheduling information, and if the first uplink packet transmission in the first time slot is restricted, receiving, from the second terminal, the second uplink packet transmission in the first time slot.

In the method, further comprises transmitting, to the first terminal, information corresponding to the second uplink packet transmission in the first time slot of the second terminal in a second time slot preceding the first time slot, and the information corresponding to the second uplink packet transmission in the first time slot of the second terminal comprises indication indicating the first terminal to skip the first uplink packet transmission in the first time slot.

In the method, further comprises transmitting, to the first terminal, information corresponding to the second uplink packet transmission in the first time slot of the second terminal in a broadcasting signal, and the information corresponding to the second uplink packet transmission in the first time slot of the second terminal comprises information indicating that the first time slot is scheduled for the second uplink packet transmission of the second terminal.

In accordance with an aspect of the present disclosure, a terminal is provided. The terminal includes a transceiver configured to receive and transmit a signal, and at least one processor configured to receive, from a base station, scheduling information for a first uplink packet transmission in a first time slot, determine whether the first uplink packet transmission in the first time slot is restricted based on information corresponding to a second uplink packet transmission in the first time slot of another terminal, and if the first uplink packet transmission in the first time slot is restricted, skip the first uplink packet transmission in a first time slot.

In accordance with an aspect of the present disclosure, a base station is provided. The base station includes a transceiver configured to receive and transmit a signal, and at least one processor configured to transmit, to a first terminal, first scheduling information for a first uplink packet transmission in a first time slot, transmit, to a second terminal, second scheduling information for a second uplink packet transmission in the first time slot, determine whether the first uplink packet transmission in the first time slot is restricted based on the second scheduling information, and if the first uplink packet transmission in the first time slot is restricted, receive, from the second terminal, the second uplink packet transmission in the first time slot.

In a feature of the present disclosure, it is possible to provide a method and an apparatus of handling packet collisions in next generation communication system.

Other aspects, advantages, and salient features of the disclosure will become apparent to those skilled in the art from the following detailed description, which, taken in conjunction with the annexed drawings, discloses various embodiments of the pre sent disclosure.

BRIEF DESCRIPTION OF THE DRAWINGS

Throughout the drawings, it should be noted that like reference numbers are used to depict the same or similar elements, features, and structures.

DETAILED DESCRIPTION

Figure 1:
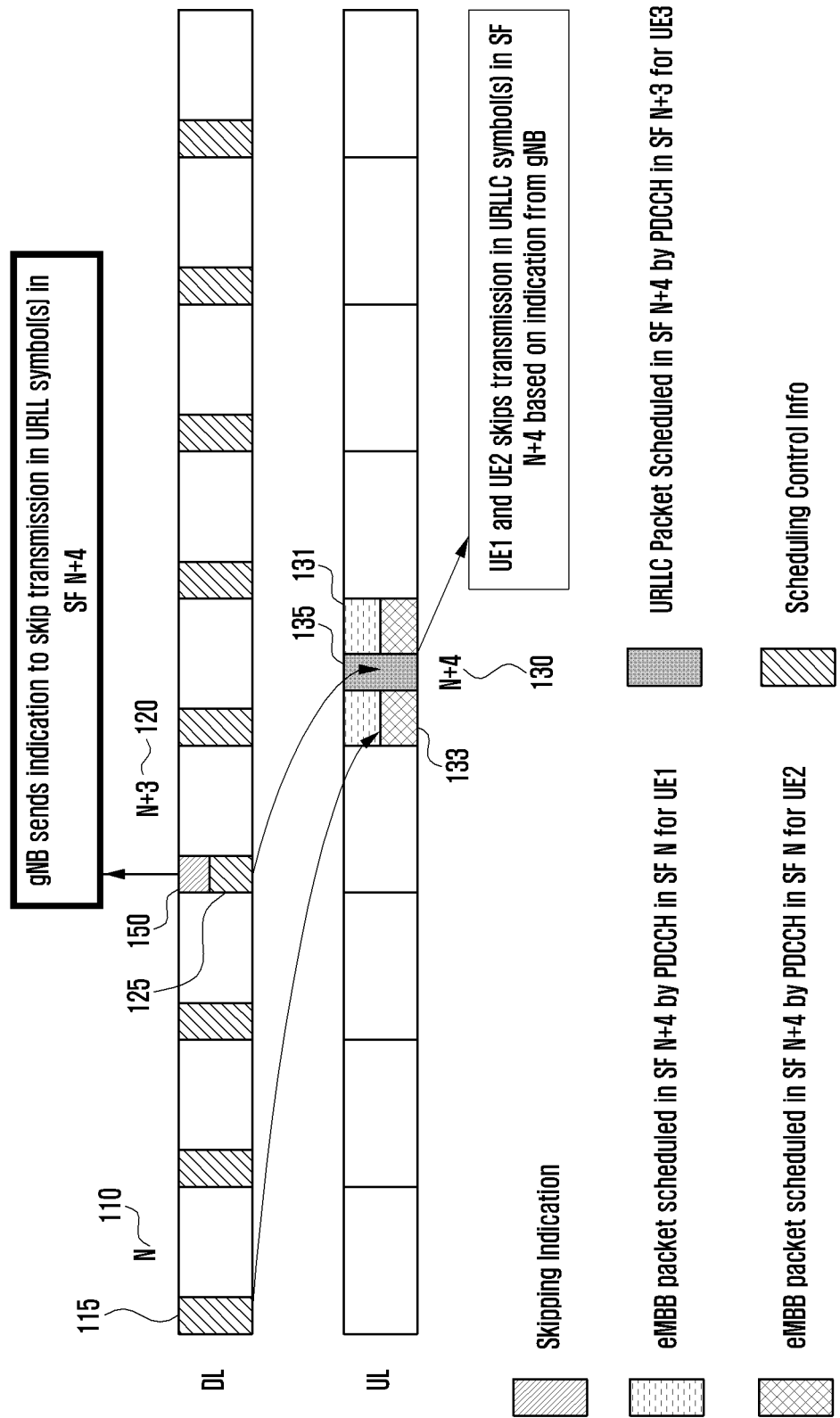
FIG. 1 illustrates an operation of handling collision according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the drawings, some elements are exaggerated, omitted, or only outlined in brief, and thus may be not drawn to scale. The same or similar reference symbols are used throughout the drawings to refer to the same or like parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out operations of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit," "module" or the like may refer to a software component or hardware component, such as an field-programmable gate array (FPGA) or application specific integrated circuits (ASIC) capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card. A component or unit may include one or more processors.

Prior to the detailed description, terms or definitions necessary to understand the present disclosure are described. However, these terms should be construed in a non-limiting way.

The "base station" (BS) is an entity communicating with a user equipment and may be referred to as BS, base transceiver station (BTS), NodeB (NB), eNodeB (eNB), access point (AP), or 5G NodeB (gNB). The "user equipment" (UE) is an entity communicating with a base station and may be referred to as UE, device, mobile station (MS), mobile equipment (ME), or terminal. Symbol refers to orthogonal frequency-division multiplexing (OFDM) symbol in the description.

In recent years, several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. Accordingly, fifth generation wireless communication system is being developed to meet the growing demand for high speed data services, support ultra-reliability and low latency applications and support massive MTC.

For uplink (UL) packet transmission (UE, terminal) (for example, UE1) is first allocated resources using scheduling control channel (e.g., a physical downlink common control channel (PDCCH)) in time slot (e.g., a subframe) N and the UE (UE1) transmits using the allocated resources in time slot N+P. The value of 'P' is different for different type of services/packets. For enhanced mobile broadband (eMBB) service/packet 'P' is larger than ultra-low latency (URLL) (e.g., ultra-reliable and low latency communication (URLLC)) service/packet. In order to support low latency 'P' is smaller for URLLC packet. This may result in collision between URLLC and eMBB packet transmissions from different UEs (for example, UE1 and UE3).

In another scenario a UE (for example, UE2) may be allocated semi persistently scheduled (SPS) resource. The allocated SPS resource occur periodically every SPS interval. In this case URLLC packet resources allocated to another UE (for example, UE3) using dynamic scheduling may collide with SPS resource.

Accordingly, a method of handling packet collisions is needed.

Collision Handling in UL

Method 1:

FIG. 1 illustrates an operation of handling collision according to an embodiment of the present disclosure.

Referring to FIG. 1, in method 1, if URLLC packet 135 scheduled in time slot (e.g., a subframe) 'X' (for example, N+4 subframe) 130 overlaps with one or more eMBB packet(s) 131, 133 then, gNB/BS (base station) transmits (broadcast or dedicated manner) an indication (for example, skipping indication or pre-emption indication) 150 to eMBB UE(s) (for example, UE1 and UE2) in time slot 'X-P' (P>0) (for example, N+3 subframe) 120 to skip UL transmission (i.e., eMBB packet(s)) in URLLC symbol(s) in time slot 'X'

130 OR drop UL packet transmission (i.e., eMBB packet(s)) in time slot 'X' 130. The UE (i.e., UE1 and/or UE2) skips UL transmission (i.e., eMBB packet(s)) in the URLLC symbol(s) which overlaps with the UL packet transmission or the UE (i.e., UE1 and/or UE2) drops UL packet transmission (i.e., eMBB packet(s)) if it overlaps with URLLC symbol(s). In an embodiment of the present disclosure, if the number of symbols where there is collision is above a threshold then the UE (i.e., UE1 and/or UE2) skips entire packet transmission otherwise it skips only transmission in colliding symbols. The threshold can be signaled by the gNB/BS in the indication 150 and/or in broadcast and/or in dedicated signaling.

In an embodiment of the present disclosure, 'P' can be in unit of symbols and/or subframes and/or time slots. In an embodiment of the present disclosure, the information of 'P' can be broadcasted and/or explicitly indicated in the RRC signaling. In alternate embodiment the 'P' can be at a fixed offset from time slot 'X' 130 in which the UL (uplink) eMBB packet is to be transmitted. In an embodiment of the present disclosure, the gNB/BS can configure a UE to monitor indication (i.e., skipping indication or pre-emption indication) 150 in time slot 'X-P' 120 or not. This can be determined by UE capability. In an embodiment of the present disclosure, the UE monitors for the indication 150 from a time slot 110 in which the UL packet is scheduled (i.e., PDCCH scheduling packet is received) until the time slot 130 in which the UL packet is scheduled to be transmitted. The gNB/BS can configure a UE to monitor the indication (i.e., skipping or pre-emption indication) 150. In another embodiment of the present disclosure, the UE monitors for the indication 150 in time interval comprising of 'X1' slots before the time slot in which the UL packet is scheduled to be transmitted. 'X1' can be signaled by the gNB/BS or can be pre-defined. The gNB/BS can configure a UE to monitor the indication (i.e., skipping or pre-emption indication) 150.

In an embodiment of the present disclosure, the one or more time slots 'X' 130 can be explicitly indicated in the indication 150. In an alternate embodiment of the present disclosure, one or more time slots 'X' 130 can be at a fixed offset from time slot 120 in which indication 150 is transmitted by the gNB/BS.

In an embodiment of the present disclosure, the one or more URLLC symbol(s) to be skipped in one or time slots 'X' 130 can be explicitly indicated in the indication 150 by the gNB/BS. In an alternate embodiment of the present disclosure, the one or more URLLC symbol(s) can be pre-defined. In another embodiment of the present disclosure, the one or more URLL symbol(s) can be broadcasted in system information by the gNB/BS.

In an embodiment of the present disclosure, the indication 150 can be signaled in broadcast or dedicated manner. In a case of dedicated signaling, the indication 150 can be addressed to UE's cell-radio network temporary identifier (C-RNTI). For example, if the scheduled resource for the UE1 and the scheduled resource for the UE3 only overlaps and the scheduled resource for the UE2 and the scheduled resource for the UE3 does not overlaps, the indication 150 can be addressed to UE1's C-RNTI. Depending on whether collision is with one or multiple UEs, appropriate signaling method can be used by the gNB/BS. In a case of broadcast signaling, the indication 150 can be addressed to broadcast radio network temporary identifier (RNTI). Alternately, in a case of broadcast signaling, the indication 150 can be addressed to a new RNTI (e.g., skip-RNTI). The UEs which have been scheduled UL packet (and/or UL packet (e.g., eMBB) which has low priority compared to other packets (e.g., URLLC)) may only monitor indication 150 addressed to skip-RNTI. In an embodiment of the present disclosure, the indication 150 can be an radio resource control (RRC) message or medium access control (MAC) control element (CE) included in DL MAC packet data unit (PDU) or downlink control information (DCI) in PDCCH or group common DCI in PDCCH. In an embodiment of the present disclosure, the group common DCI for the skipping indication can be transmitted separately from group common DCI for slot format indication. In an embodiment of the present disclosure, the control resource set (CORESET) information for monitoring the group common DCI for the skipping indication can be signaled in system information or in RRC signaling. In an embodiment of the present disclosure, the monitoring interval for monitoring the group common DCI for the skipping indication can be signaled in system information or in RRC signaling. In an embodiment of the present disclosure, the indication 150 can also be signaled using broadcast channel (BCH).

Referring to FIG. 1, an example of handling collision using method 1 is illustrated. As illustrated in FIG. 1, the gNB schedules UE1 and UE2 in subframe N+4 130 (for example, uplink eMBB packet transmission, 131, 133) by transmitting scheduling control information (i.e., PDCCH) 115 in subframe N 110. Later there is an urgent need to schedule UE3 (for example, URLLC service). The UE3 is scheduled in same subframe N+4 130 by transmitting scheduling control information (i.e., PDCCH) 125 in subframe N+3 120. In this case, the gNB/BS knows that it has already scheduled the UE1 and the UE2 in subframe N+4 130. To avoid collision, the URLLC service is prioritized over the eMBB service. The gNB/BS sends an indication 150 before the subframe N+4 130 indicating the UE1 and the UE2 to skip transmission (of the uplink eMBB packet) in the URLLC symbols 135 in the SF (subframe) N+4 130. Alternately, the gNB/BS sends an indication 150 before subframe N+4 130 indicating the UE1 and the UE2 to drop the UL packet transmission in the SF N+4 130.

Figure 2:
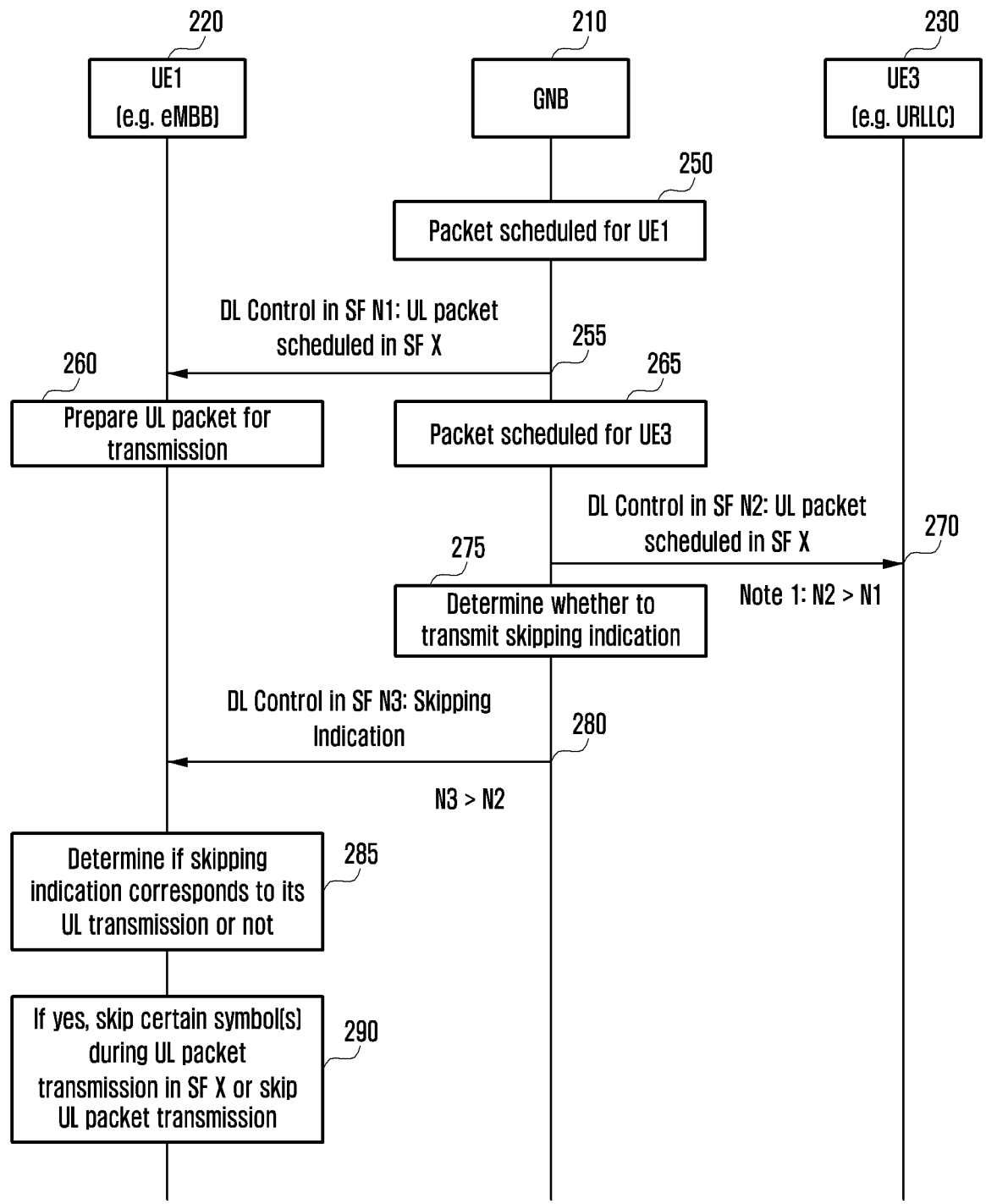
FIG. 2 illustrates a message flow between a user equipment (UE) and 5G NodeB/base station (gNB/BS) for collision handling in a case of dynamic scheduling according to an embodiment of the present disclosure.

FIG. 2 illustrates a message flow between a UE and gNB/BS for collision handling in a case of dynamic scheduling according to an embodiment of the present disclosure.

Referring to FIG. 2, at operation 250, a gNB/BS 210 determines scheduling a UE1 220 for uplink eMBB packet transmission, and determines packet scheduling information for the UE1 220. At operation 255, the UE1 220 is first scheduled an eMBB packet in subframe (SF) X by scheduling control information transmitted by the gNB/BS 210 in subframe N1. At operation 260, the UE1 220 prepares uplink eMBB packet for transmission.

At operation 265, the gNB/BS 210 determines scheduling a UE3 230 for URLLC packet transmission, and determines packet scheduling information for the UE3 230. At operation 270, the UE3 230 is scheduled a URLLC packet in SF X by scheduling control information transmitted by the gNB/BS 210 in subframe N2, where N2>N1.

At operation 275, the gNB/BS 210 determines whether to transmit, to the UE1 220, the skipping indication 150 or not. At operation 280, the skipping indication 150 is sent, from the gNB/BS 210 to the UE1 220, in subframe N3 where N3>N2, if there is collision between eMBB packet scheduled to UE1 220 and the URLLC packet scheduled to the UE3 230.

If the skipping indication 150 is received by UE1 220, then, at operation 285, the UE1 220 determines whether the skipping indication 150 corresponds to its UL packet transmission. If the UE1 220 is applicable to its UL packet transmission, then the UE1 220 skips UL transmission in URLLC symbol(s) or drop the UL packet transmission, at operation 290. The skipping indication 150 is applicable to UE1 220 it is addressed to it and/or its UL packet transmission collides with the URLLC symbol(s).

Figure 3:
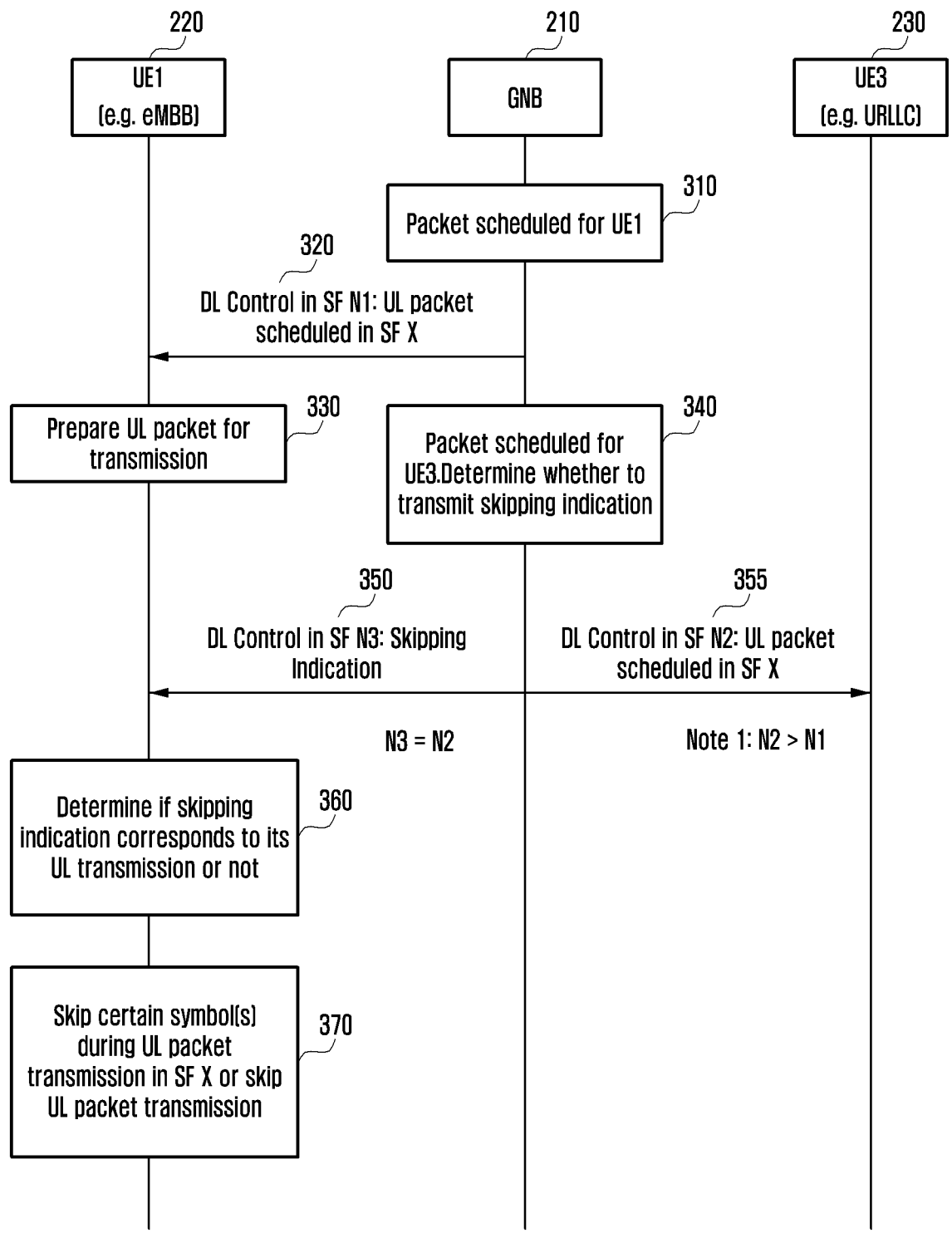
FIG. 3 illustrates a message flow between a UE and gNB/BS for collision handling in a case of dynamic scheduling according to an embodiment of the present disclosure.

FIG. 3 illustrates a message flow between a UE and gNB/BS for collision handling in a case of dynamic scheduling according to an embodiment of the present disclosure.

Referring to FIG. 3, it is same as FIG. 2 except that skipping indication 150 is sent in subframe N3 where N3 equals N2.

At operation 310, the gNB/BS 210 determines scheduling the UE1 220 for uplink eMBB packet transmission, and determines packet scheduling information for the UE1 220. At operation 320, the UE1 220 is first scheduled an eMBB packet in SF X by scheduling control information transmitted by the gNB/BS 210 in subframe N1. At operation 330, the UE1 220 prepares uplink eMBB packet for transmission.

At operation 340, the gNB/BS 210 determines scheduling the UE3 230 for URLLC packet transmission, and determines packet scheduling information for the UE3 230. The gNB/BS 210 determines whether to transmit, to the UE1 220, the skipping indication 150 or not.

At operation 355, the UE3 230 is scheduled a URLLC packet in SF X by scheduling control information transmitted by the gNB/BS 210 in subframe N2, where N2>N1. At operation 350, the skipping indication 150 is sent, from the gNB/BS 210 to the UE1 220, in subframe N3 where N3=N2, if there is collision between eMBB packet scheduled to UE1 220 and the URLLC packet scheduled to the UE3 230.

If the skipping indication 150 is received by UE1 220, then, at operation 360, the UE1 220 determines whether skipping indication 150 corresponds to its UL packet transmission. If the UE1 220 is applicable to its UL packet transmission, then the UE1 220 skips UL transmission in the URLLC symbol(s) or drop the UL packet transmission, at operation 370. The skipping indication 150 is applicable to UE1 220 it is addressed to it and/or its UL packet transmission collides with URLLC symbol(s).

Figure 4:
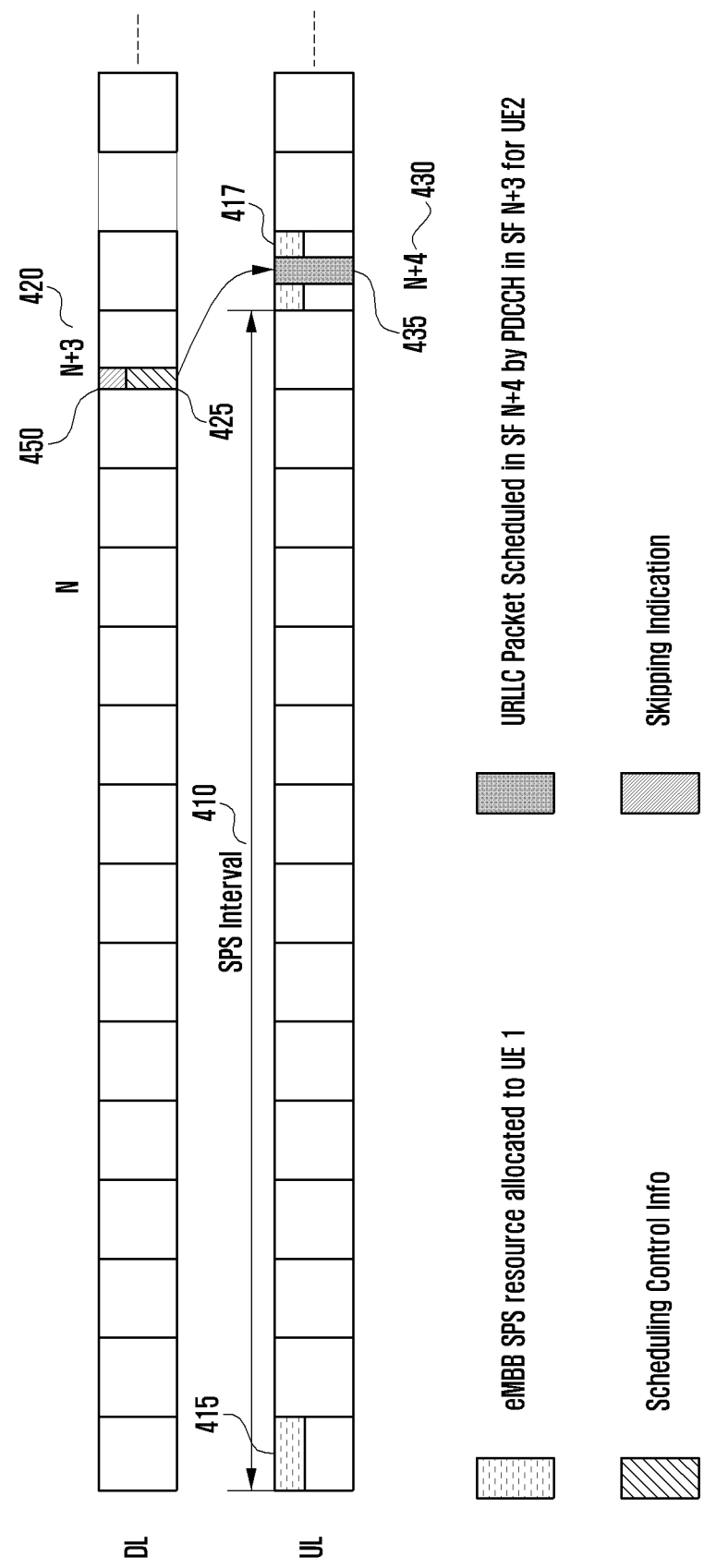
FIG. 4 illustrates an operation of handling collision according to an embodiment of the present disclosure.
Figure 5:
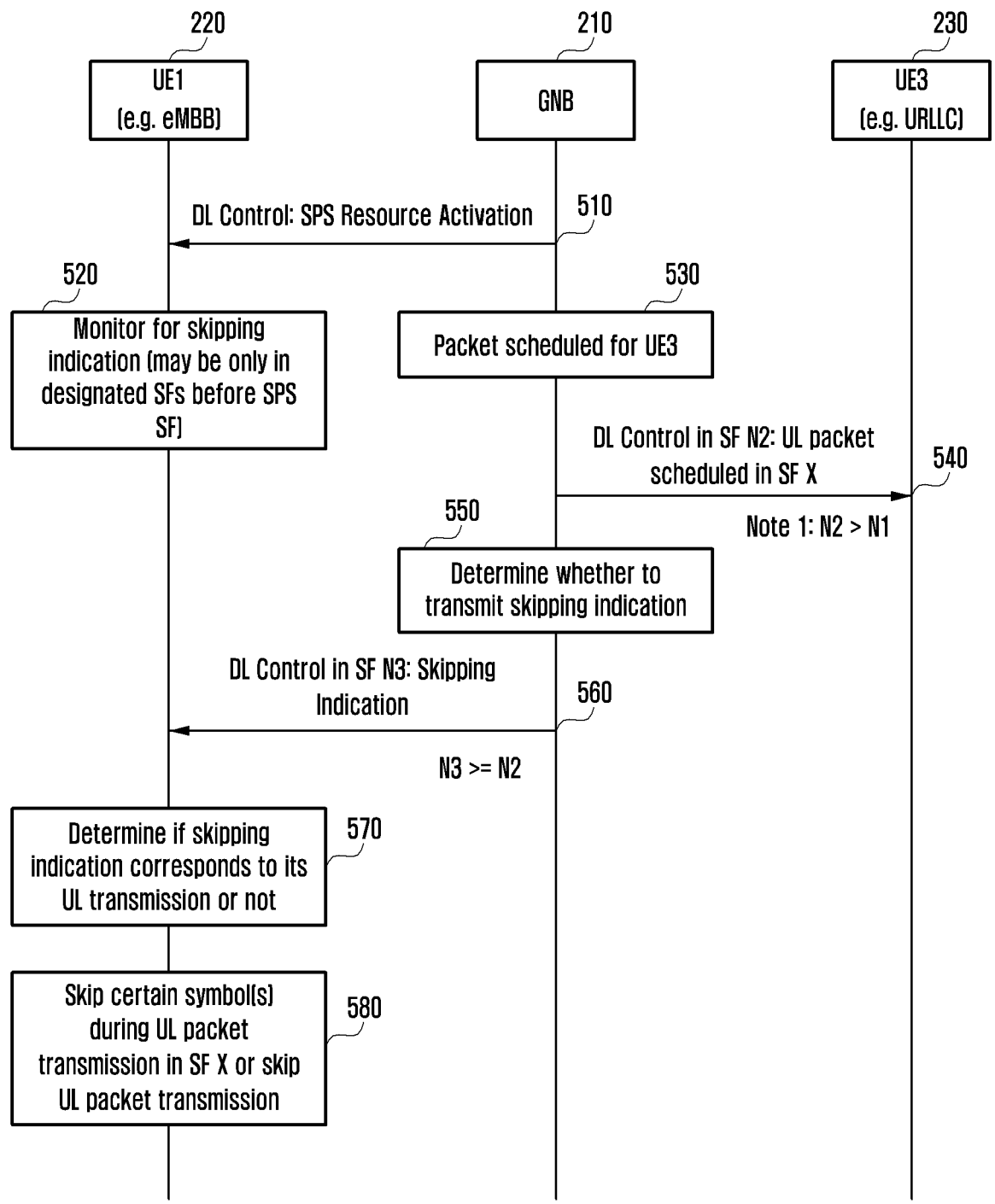
FIG. 5 illustrates a message flow between a UE and gNB/BS for collision handling in a case of semi persistently scheduled (SPS) according to an embodiment of the present disclosure.

FIG. 4 illustrates an operation of handling collision according to an embodiment of the present disclosure, and FIG. 5 illustrates a message flow between a UE and gNB/BS for collision handling in a case of SPS according to an embodiment of the present disclosure.

Referring to FIG. 4, a UE (for example, the UE1) 220 may be allocated SPS resource 415, 417. The allocated SPS resource 415, 417 occur periodically every SPS interval 410. There is an urgent need to schedule the UE3 230 (for example, URLLC service). Accordingly, the UE3 230 is scheduled in same subframe N+4 430 by transmitting scheduling control information (i.e., PDCCH) 425 in subframe N+3 420. The URLLC packet resources 417 allocated to another UE (for example, the UE3) 230 using dynamic scheduling may collide with SPS resource 417.

In this case, if URLLC packet 435 scheduled in time slot (e.g., a subframe) 'X' (for example, N+4 subframe) 430 overlaps with one or more SPS resource 417 then, the gNB/BS 210 transmits (broadcast or dedicated manner) an indication (for example, skipping indication) 450 to the UE1 220 in time slot 'X-P' (P>0)(for example, N+3 subframe) 420 to skip UL transmission in URLLC symbol(s) in time slot 'X' 430 OR drop UL packet transmission in time slot 'X' 430. The UE1 220 skips UL transmission in the URLLC symbol(s) which overlaps with its UL packet transmission or the UE1 220 drops UL packet transmission if it overlaps with URLLC symbol(s). The indication 450 is almost same as described above examples.

Referring to FIG. 5, at operation 510, the UE1 220 is first scheduled SPS resource activation by the gNB/BS 210. In an embodiment of the present disclosure, the UE1 220 is scheduled the SPS resource activation in SF X by scheduling control information transmitted by the gNB/BS 210 in subframe N1. At operation 520, the UE1 220 prepares and transmits uplink packet in SPS resources scheduled by the gNB/BS 210. The UE1 220 monitors for skipping indication 450. The skipping indication 450 may be only in designated subframes before the SPS subframe.

At operation 530, the gNB/BS 210 determines scheduling the UE3 230 for URLLC packet transmission, and determines packet scheduling information for the UE3 230. At operation 540, the UE3 230 is scheduled a URLLC packet in SF X by scheduling control information transmitted by the gNB/BS 210 in subframe N2. In an embodiment of the present disclosure, the N2 is greater than the N1.

At operation 550, the gNB/BS 210 determines whether to transmit, to the UE1 220, the skipping indication 450 or not. In an embodiment of the present disclosure, the gNB/BS 210 determines scheduling the UE3 230 for URLLC packet transmission, and determines whether to transmit the skipping indication 450 to the UE1 220 at the same time.

At operation 560, the skipping indication 450 is sent, from the gNB/BS 210 to the UE1 220, in subframe N3, if there is collision between the SPS resources scheduled to UE1 220 and the URLLC packet scheduled to the UE3 230. In an embodiment of the present disclosure, the N3 is greater or equal to the N2. For example, the gNB/BS 210 transmits the scheduling information of the URLLC packet to the UE3, and transmits the skipping indication 450 at the same time.

If the skipping indication 450 is received by UE1 220, then, at operation 570, the UE1 220 determines whether skipping indication 450 corresponds to its UL packet transmission. If the UE1 220 is applicable to its UL packet transmission, then the UE1 220 skips UL transmission in URLLC symbol(s) or drop the UL packet transmission, at operation 580. The skipping indication 450 is applicable to UE1 220 it is addressed to it and/or its UL packet transmission collides with URLLC symbol(s).

In an embodiment whether the UE has to apply skipping/ dropping rule for a scheduled UL packet can be signaled by the gNB/BS 210. Only if this is signaled then only the UE skip/drop based on the skipping indication 150, 450.

1. Whether the UE has to apply the skipping rule or process the skipping indication or not can be indicated in dedicated signaling.

2. Whether the UE has to apply the skipping rule or process the skipping indication can be specified for each logical channel or logical channel group (LCG). Scheduling information can be there specific to the logical channel or the LCG. Accordingly, the UE applies the skipping rule or process the skipping indication for UL packets of the logical channel or the LCG for which it is allowed.

3. Whether to apply the skipping rule or process the skipping indication can be specified for each radio access network (RAN) slice.

4. A packet type can be there in scheduling information. Whether to apply the skipping rule or process the skipping indication can be applied for specific packet type. Accordingly, the UE applies the skipping rule or process the skipping indication for the UL packets of packet type for which it is allowed.

In an embodiment of the present disclosure, the skipping indication 150, 450 can be named as URLLC usage indication or overlapping indication. The gNB/BS 210 transmits (broadcast or dedicated manner) an indication that UL URLLC symbol(s) in time slot 'X' are used. The UE skips the UL transmission in the URLLC symbol(s) which overlaps with its UL packet transmission or the UE drops UL packet transmission if it overlaps with the URLLC symbol(s). In an embodiment of the present disclosure, the one or more time slots 'X' can be explicitly indicated in the indication 150, 450. In an alternate embodiment of the present disclosure, one or more time slots 'X' can be at a fixed offset from time slot in which the indication 150, 450 is transmitted by the gNB/BS 210. In an embodiment of the present disclosure, the one or more URLLC symbol(s) used in one or more time slots 'X' can be explicitly indicated in the indication 150, 450 by the gNB/BS 210. In an alternate embodiment of the present disclosure, the one or more URLLC symbol(s) can be pre-defined. In another embodiment of the present disclosure, the one or more URLLC symbol(s) can be broadcasted in system information by the gNB/BS 210.

Figure 6:
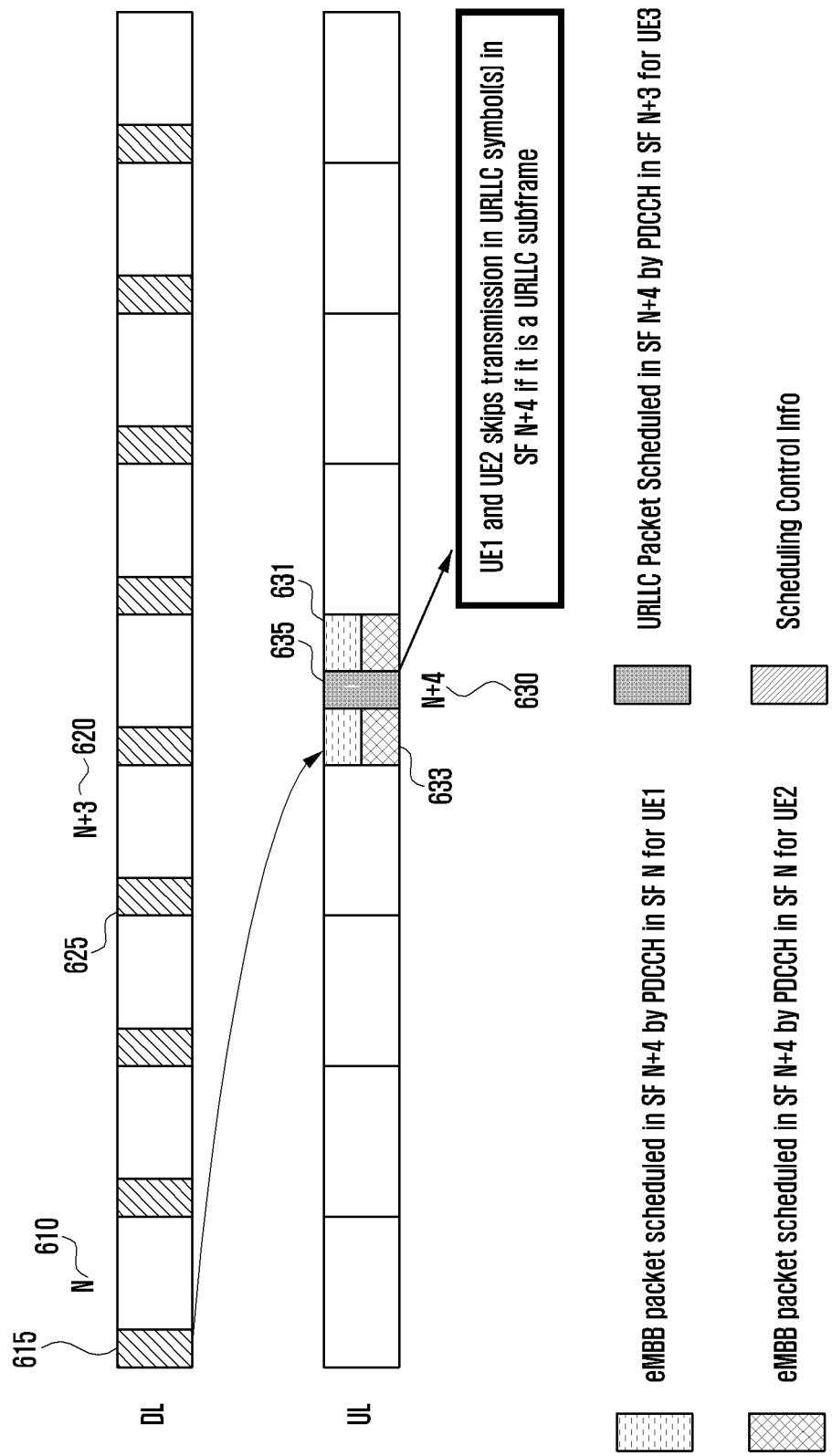
FIG. 6 illustrates an operation of handling collision according to an embodiment of the present disclosure.

Method 2:

FIG. 6 illustrates an operation of handling collision according to an embodiment of the present disclosure.

Referring to FIG. 6, in method 2, the UE (for example, UE1 and/or UE2) skips transmission in the one or more URLLC symbols(s) 635 in time slot X (for example, N+4 subframe) 630, if time slot X 630 is a URLLC time slot or is a time slot having URLLC symbols, and UL packet 631, 633 is scheduled to the UE (UE1 and/or UE2) in time slot X 630 and resources allocated for the UL packet 631, 633 overlaps with URLLC resources 635. In an embodiment of the present disclosure, the one or more URLLC time slots 630 are signaled by the gNB/BS in broadcast signaling. In an embodiment of the present disclosure, the one or more URLLC symbols 635 in the URLLC time slots 630 can be pre-defined in system. Alternately, the one or more URLLC symbols 635 in URLLC time slots 630 can also be signaled by the gNB/BS in broadcast signaling. Frequency resources in URLLC symbols 635 can also be signaled if the symbol is partially used for URLLC.

Referring to FIG. 6, an example of handling collision using method 2 is illustrated. As illustrated in FIG. 6, the gNB/BS schedules the UE1 and the UE2 in subframe N+4 630 (for example, uplink eMBB packet transmission, 631, 633) by transmitting scheduling control information (i.e., PDCCH) 615 in subframe N 610. There is an urgent need to schedule UE3 (for example, URLLC service). Accordingly, the UE3 is scheduled in same subframe N+4 630 by transmitting scheduling control information (i.e., PDCCH) 625 in subframe N+3 620. Alternately, the UE3 may autonomously use the URLLC resource 635 in subframe N+4 630. To avoid collision, the URLLC service is prioritized over the eMBB service. The UE1 and/or the UE2 skip transmission in URLLC symbols 635 in the SF N+4 630, if it is URLLC subframe and the resources allocated for its UL packet 631, 633 in SF N+4 630 overlaps with the URLLC resources 635. Alternately, the UE1 and the UE2 drops the UL packet transmission in SF N+4 630 if SF N+4 630 is a URLLC subframe and the resources allocated for its UL packet 631, 633 in SF N+4 630 overlaps with the URLLC resources 635.

Figure 7:
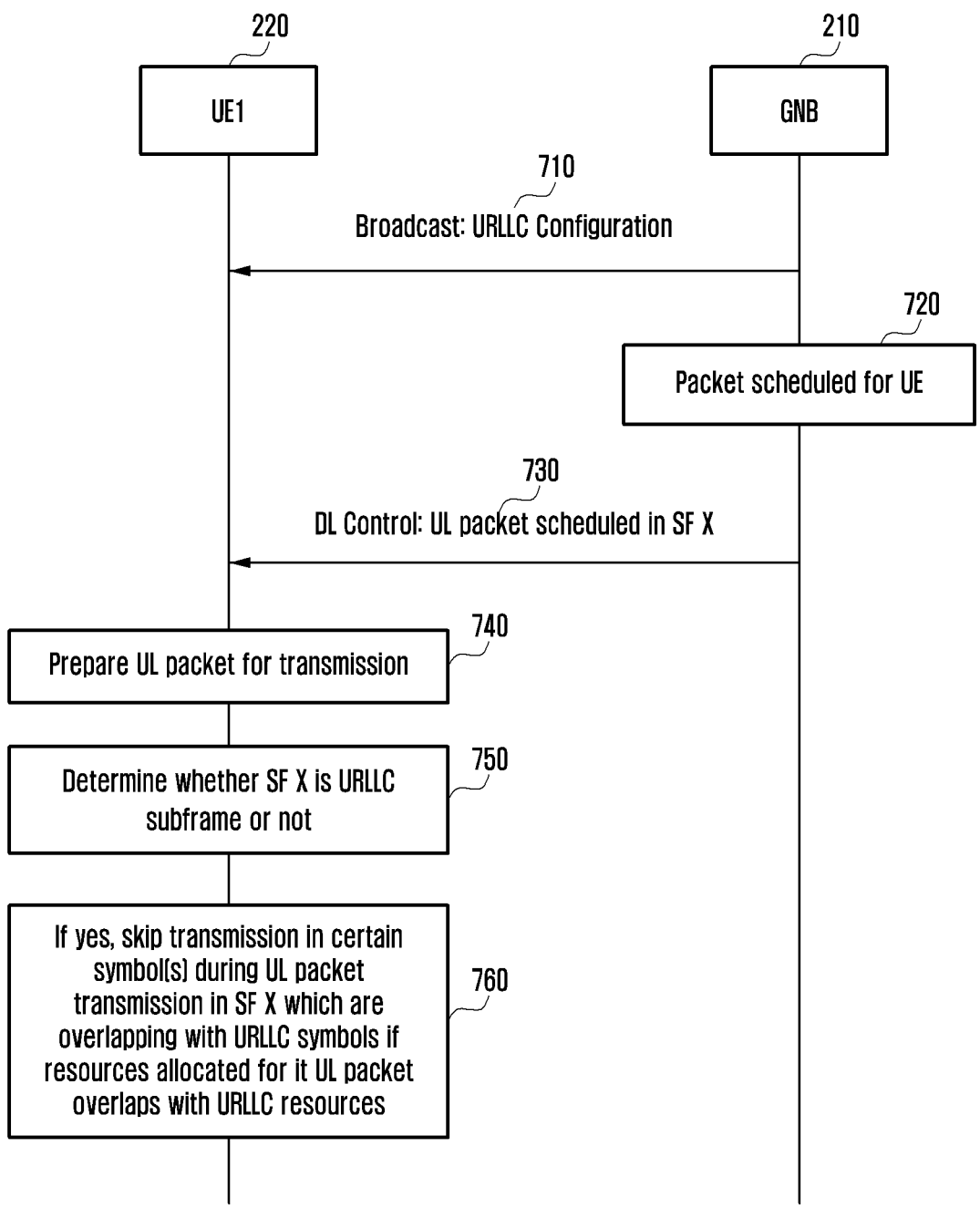
FIG. 7 illustrates a message flow between a UE and gNB/BS for collision handling in a case of dynamic scheduling according to an embodiment of the present disclosure.

FIG. 7 illustrates a message flow between a UE and gNB/BS for collision handling in a case of dynamic scheduling according to an embodiment of the present disclosure.

Referring to FIG. 7, at operation 710, URLLC configuration information (for example, subframes, OFDM symbols, physical resource blocks (PRBs) or sub carriers, and the like) is broadcasted by the gNB/BS 210. At operation 720, the gNB/BS 210 determines scheduling the UE1 220 for uplink eMBB packet transmission, and determines packet scheduling information for the UE1 220. At operation 730, the UE1 220 is first scheduled an eMBB packet in SF X 630 by scheduling control information transmitted by the gNB/BS 210. At operation 740, the UE1 220 prepare packet for transmission.

At operation 750, the UE1 220 determines whether the SF X is URLLC subframe or not.

At operation 760, the UE1 220 skip transmission in URLLC symbols 635 in SF X 630, if it (the scheduled subframe of the UE1 220) is URLLC subframe and the resources allocated for its UL packet in SF X 630 overlaps with the URLLC resources 635 in that subframe 630. Alternately, the UE1 220 drops the UL packet transmission in SF X 630 if it is URLLC subframe and the resources allocated for its UL packet in SF X 630 overlaps with the URLLC resources 635 in that subframe 630.

Figure 8:
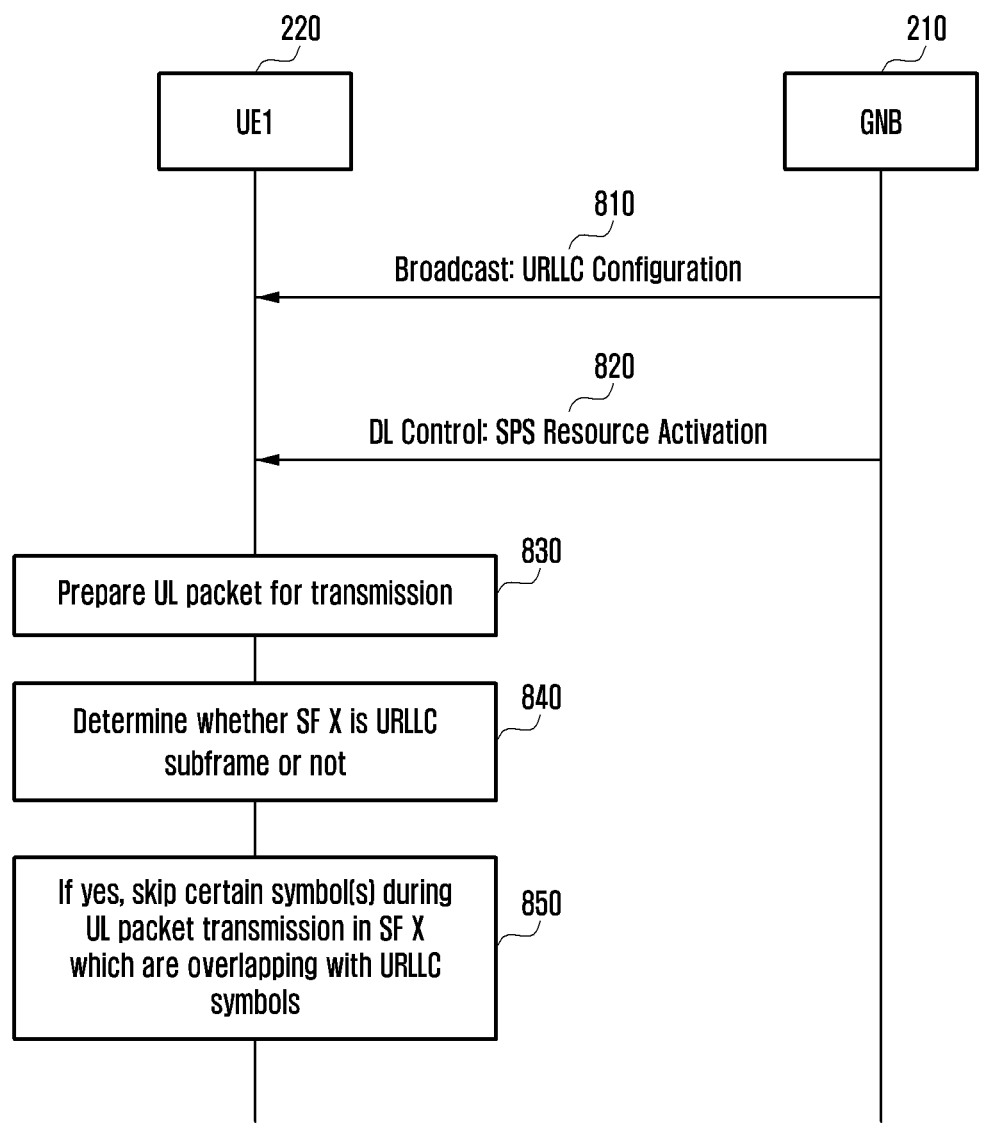
FIG. 8 illustrates a message flow between a UE and gNB/BS for collision handling in a case of SPS according to an embodiment of the present disclosure.

FIG. 8 illustrates a message flow between a UE and gNB/BS for collision handling in a case of SPS according to an embodiment of the present disclosure.

Referring to FIG. 8, at operation 810, URLLC configuration information (for example, subframes, OFDM symbols, PRBs or sub carriers, and the like) is broadcasted by the gNB/BS 210. At operation 820, the UE1 220 is first scheduled SPS resource activation by the gNB/BS 210. In an embodiment of the present disclosure, the UE1 220 is scheduled the SPS resource activation in SF X. At operation 830, the UE1 220 prepares and transmits uplink packet in SPS resources scheduled by the gNB/BS 210.

At operation 840, the UE1 220 determines whether the SF X is URLLC subframe or not.

At operation 850, the UE1 220 skip transmission in URLLC symbols in SF X, if it (the scheduled SPS subframe X of the UE1 220) is URLLC subframe and the SPS resources allocated for its UL packet in SF X overlaps with the URLLC resources in that subframe. Alternately, the UE1 220 drops the UL packet transmission in SF X if it is URLLC subframe and the resources allocated for its UL packet in SF X overlaps with the URLLC resources in that subframe.

In an embodiment of the present disclosure whether the UE has to apply the skipping/dropping rule for a scheduled UL packet can be signaled by the gNB/BS. Only if this is signaled then only the UE skip/drop if the resources allocated for its UL packet in the SF X overlaps with the URLLC resources in that subframe.

1. Whether the UE has to apply the skipping rule or not can be indicated in dedicated signaling.

2. Whether the UE has to apply the skipping rule can be specified for each logical channel or LCG. Scheduling information can be there specific to the logical channel or the LCG. Accordingly, the UE applies the skipping rule for the UL packets of the logical channel or the LCG for which it is allowed.

3. Whether to apply the skipping rule can be specified for each RAN slice.

4. A packet type can be there in scheduling information. Whether to apply the skipping rule can be applied for specific packet type. Accordingly, the UE applies the skipping rule for the UL packets of packet type for which it is allowed.

Figure 9:
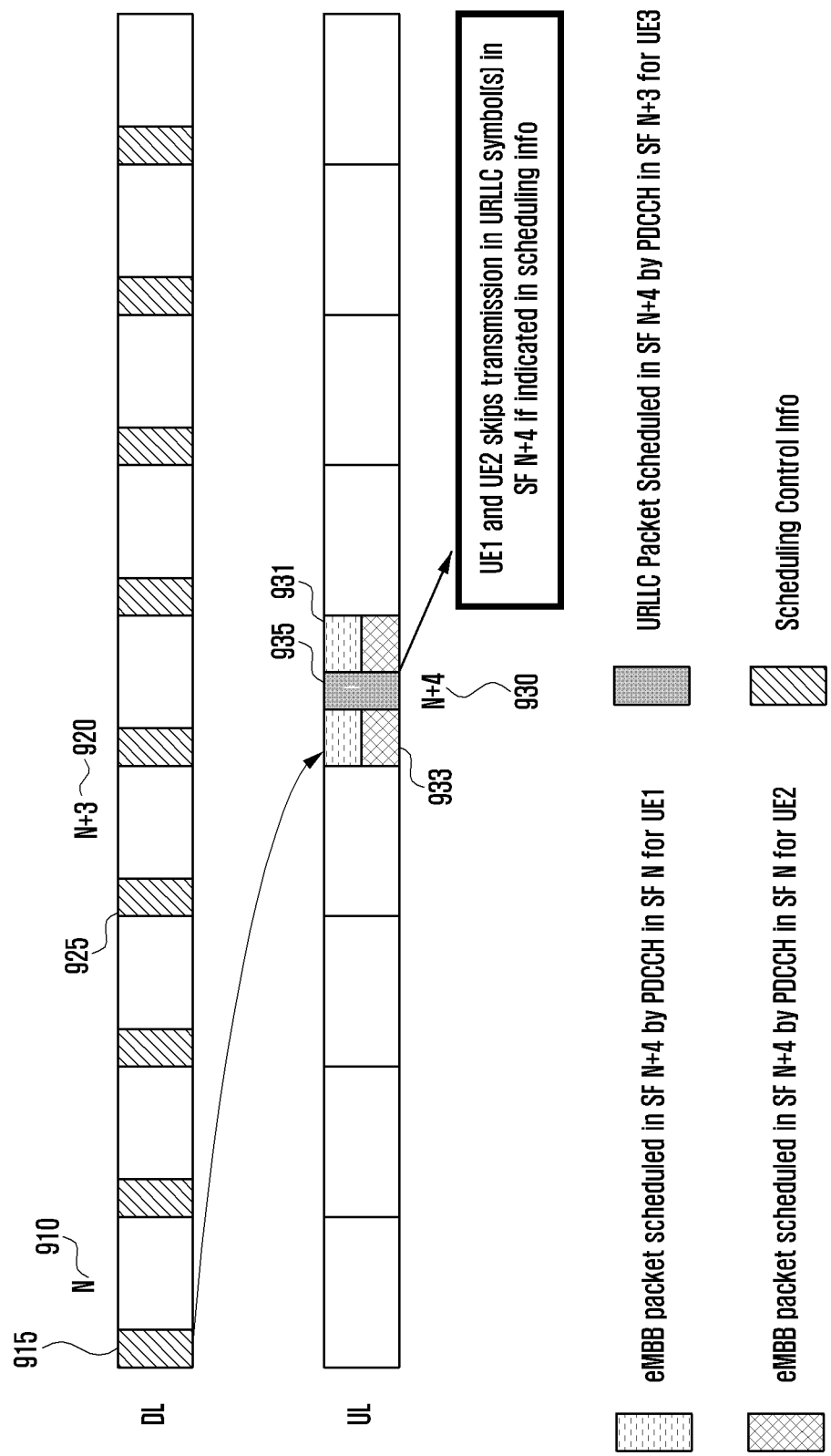
FIG. 9 illustrates an operation of handling collision according to an embodiment of the present disclosure.

Method 3:

FIG. 9 illustrates an operation of handling collision according to an embodiment of the present disclosure.

Referring to FIG. 9, in method 3, the UE (for example, UE1 and/or UE2) skips transmission in the one or more URLLC symbols(s) 935 in time slot X (for example, N+4 subframe) 930, if UL packet 931, 933 is scheduled to the UE (UE1 and/or UE2) in the time slot X 930 and scheduling information 915 indicates to skip the one or more URLLC symbols 935. In an embodiment of the present disclosure, the URLLC symbols 935 to be skipped are indicated in scheduling information.

Referring to FIG. 9, an example of handling collision using the proposed method is illustrated. As illustrated in FIG. 9, the gNB/BS schedules the UE1 and the UE2 in subframe N+4 930 (for example, uplink eMBB packet transmission, 931, 933) by transmitting scheduling control information (i.e., PDCCH) 915 in subframe N 910. There is an urgent need to schedule UE3 (for example, URLLC service). Accordingly, the UE3 is scheduled in same subframe N+4 930 by transmitting scheduling control information (i.e., PDCCH) 925 in subframe N+3 920. Alternately, the UE3 may autonomously use the URLLC resource 935 in subframe N+4 930. To avoid collision, the URLLC service is prioritized over the eMBB service. The UE1 and/or the UE2 skip transmission in URLLC symbols 935 in SF N+4 930, if these are indicated in the scheduling information 915 transmitted in the subframe N 910. This method may lead to wastage if the URLLC symbols 935 are not used for URLLC service of the UE3. However there is reduced signaling overhead of broadcasting the URLLC configuration and the skipping indication.

The above methods have been explained for handling collision between the URLLC and eMBB across UEs. In a case of collision between the URLLC and eMBB transmission within same UE, the UE knows both the URLLC and eMBB transmission resources, so the UE can skip transmission of either the URLLC packet or the eMBB packet in colliding resources. In an embodiment of the present disclosure, the UE skips transmission of URLL packet or the eMBB packet only in symbols where there is collision. In an embodiment of the present disclosure, the UE can skip transmission of complete URLL packet or EMBB packet in a case of collision. In an embodiment of the present disclosure, the URLLC is prioritized and the eMBB transmission is skipped. In another embodiment of the present disclosure, whether to prioritize the eMBB or the URLLC can be indicated by network.

In the methods (method 1 to method 3) explained above, whether to skip only symbols or entire packet when there is collision can decide based on number of symbols where there is collision. If the number of symbols where there is collision is above a threshold then the UE skips entire packet transmission. Otherwise the UE skips only transmission in colliding symbols. Threshold can be signaled by the gNB/BS in broadcast or dedicated signaling to the UE.

Collision Handling in DL

Figure 10:
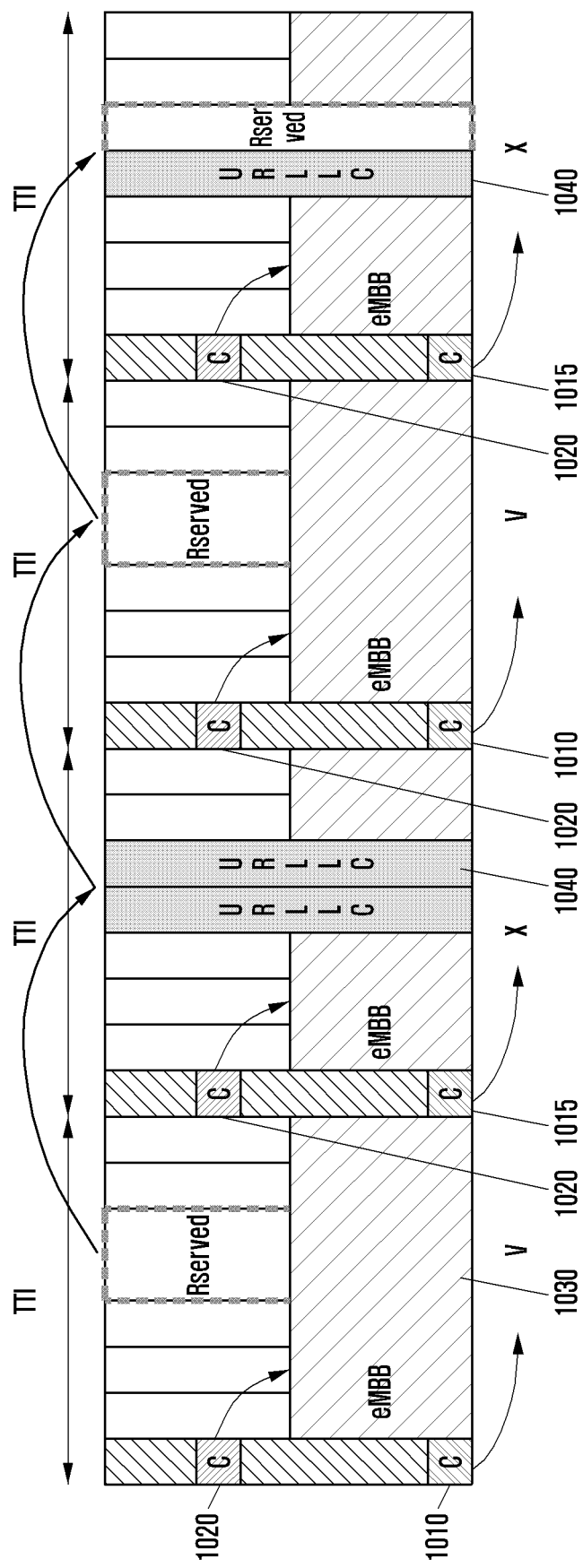
FIG. 10 illustrates an operation of handling collision in downlink according to an embodiment of the present disclosure.

Method 1:

FIG. 10 illustrates an operation of handling collision in downlink according to an embodiment of the present disclosure.

Referring to FIG. 10, in method 1, resources for URLLC 1040 are reserved and indicated to the UE in broadcast or dedicated signaling. The gNB/BS sends indication 1010, 1015 indicating whether reserved resources in the corresponding time slot (e.g., a subframe, transmission time interval (TTI), and the like) are used or not (i.e., whether URLLC traffic is scheduled or not). In an embodiment of the present disclosure, the indication 1010, 1015 can be there in grant or in DCI. In an embodiment of the present disclosure, the indication 1010, 1015 can be for a group of UEs, e.g., eMBB UEs. In an embodiment of the present disclosure, the gNB/BS can inform the UE to monitor the indication 1010, 1015 or not by RRC signaling. In an embodiment of the present disclosure, the indication 1010, 1015 can be transmitted in a dedicated channel, or a normal PDCCH at pre-defined location. In an embodiment of the present disclosure, special RNTI can be reserved for masking PDCCH for this indication 1010, 1015. This method is illustrated in FIG. 10. The gNB/BS schedules the UE (for example, downlink eMBB packet transmission, 1030) by transmitting scheduling control information (i.e., PDCCH) 1020. If the UE DL packet resources (for example, eMBB resources) 1030 collide with the URLLC resources 1040 and URLLC reserved resources are in use, then the gNB/BS transmits the indication 1015 indicting the URLLC resources 1040 are used. After, during the decoding the UE does not consider the information in colliding resources 1040. In an embodiment of the present disclosure, if the UE DL packet resources 1030 collide with the URLLC resources 1040 and URLLC reserved resources are not in use, the gNB/BS transmits the indication 1010 indicting the URLLC resources 1040 are not used. In an embodiment of the present disclosure, the indication is only transmitted when the URLLC reserved resources are used.

Figure 11:
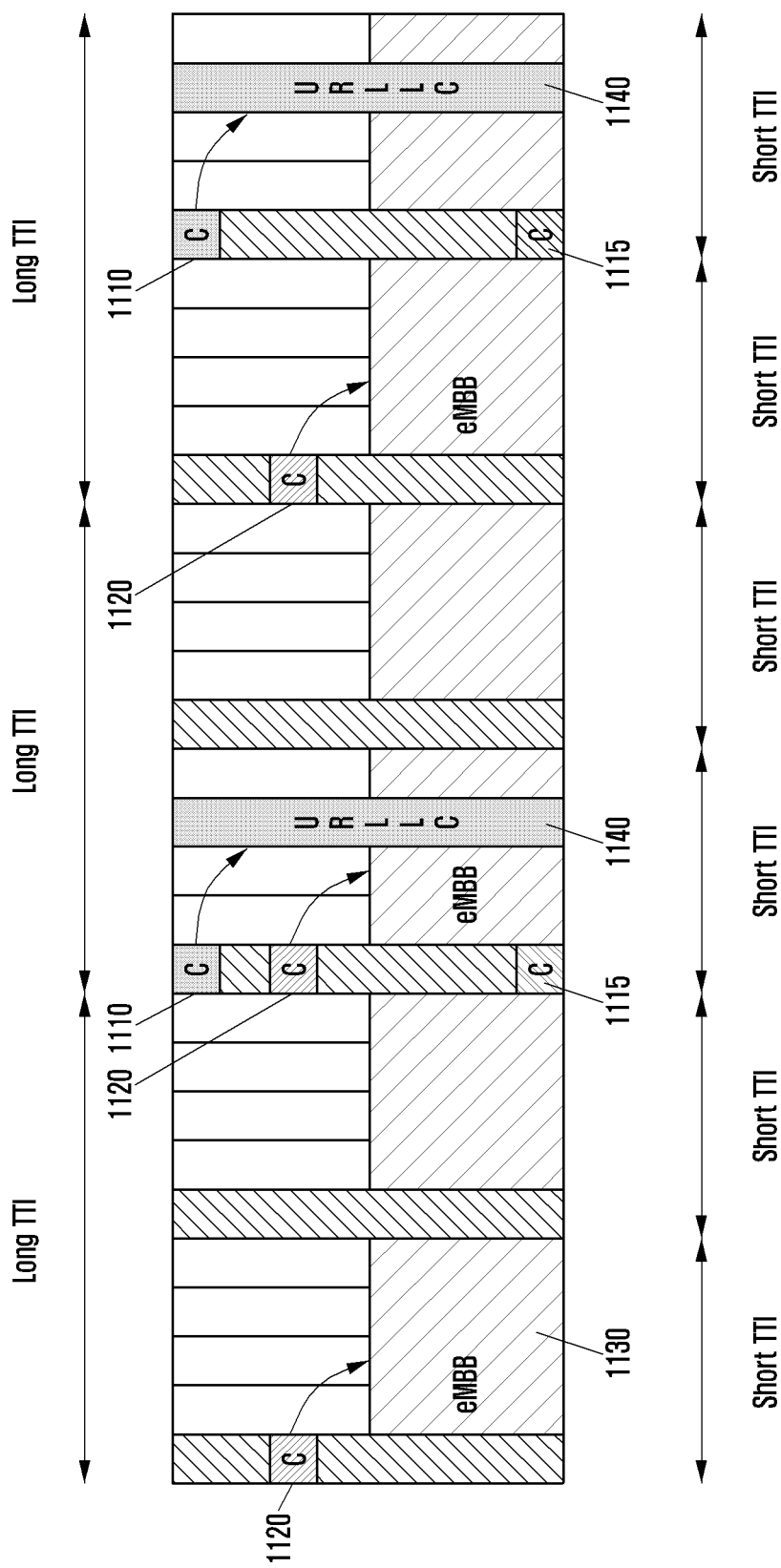
FIG. 11 illustrates an operation of handling collision in downlink according to an embodiment of the present disclosure.

Method 2:

FIG. 11 illustrates an operation of handling collision in downlink according to an embodiment of the present disclosure.

Referring to FIG. 11, in method 2, resources for URLLC 1140 are dynamically scheduled. The gNB/BS sends indication 1115 indicating that certain resources (OFDM symbols and/or PRBs) are used for URLLC in the subframe. The URLLC resources 1140 can be pre-defined or indicated in indication 1110 or broadcasted. In an embodiment of the present disclosure, for URLLC resource usage indication 1110, the UE may read PDCCH region for URLLC. The gNB/BS schedules the UE (for example, downlink eMBB packet transmission, 1130) by transmitting scheduling control information (i.e., PDCCH) 1120. If the UE DL packet resources (for example, eMBB resources) 1130 collides with the URLLC resources 1140, then the gNB/BS transmits the indication 1115 indicting the URLLC resources 1040 are used. After, during the decoding the UE does not consider the information in colliding resources 1140. This method is illustrated in FIG. 11.

The above methods have been explained for handling collision between the URLLC and cMBB transmissions across UEs. In a case of collision between the URLLC and eMBB transmission within same UE, the UE knows both the URLLC and eMBB reception resources, so the UE can skip received information of either the URLLC packet or eMBB packet in colliding resources during decoding. In an embodiment of the present disclosure, the URLLC is prioritized and the eMBB information is skipped. In another embodiment of the present disclosure, whether to prioritize the eMBB or the URLLC can be indicated by network.

Indication Information

The purpose of the indication is to inform some UEs (e.g., one or more UEs with eMBB service) that a certain amount of resources in a time slot are pre-empted and not used in the actual transmission, for example, if the resources are assigned to a UE for URLLC service. If there is conflict between the pre-empted resources and assigned resources for eMBB data scheduling in the DCI, the UE may assume that the pre-empted resources are punctured or rate-matched from the assigned resources. The pre-emptied resources may include the resources in both time domain and frequency domain. For time domain resources, the indication can be the OFDM symbols in a time slot with pre-defined duration, for example, a 7-symbol or 14-symbol slot targeted to the eMBB service based on system configuration. For example, a symbol bitmap can be used to indicate which symbol(s) needs to be pre-empted. For the frequency domain resources, it can be by default the full bandwidth in the system bandwidth or a configured bandwidth part. Or, the indication can be based on the resource block (RB) groups. There can be multiple RB groups in the full bandwidth based on a pre-defined rule. For example, a size of RB group (for example, M RBs) can be pre-defined or configured by the higher layer signaling. If the full bandwidth is expressed by N RBs, there are ceil (N/M) RB groups. It can be indicated which RB groups needs to be pre-empted. The UE can obtain that how many bits are used to indicate the pre-emption information of the RB groups in the frequency domain. Alternatively, a bitmap size of indication can be pre-defined or configured by the higher layer signaling, for example, X bits, the size of RB group can be derived based on the total number of RBs and pre-defined/indicated bitmap size, for example, M=ceil (N/X).

Indication Method

Figure 12:
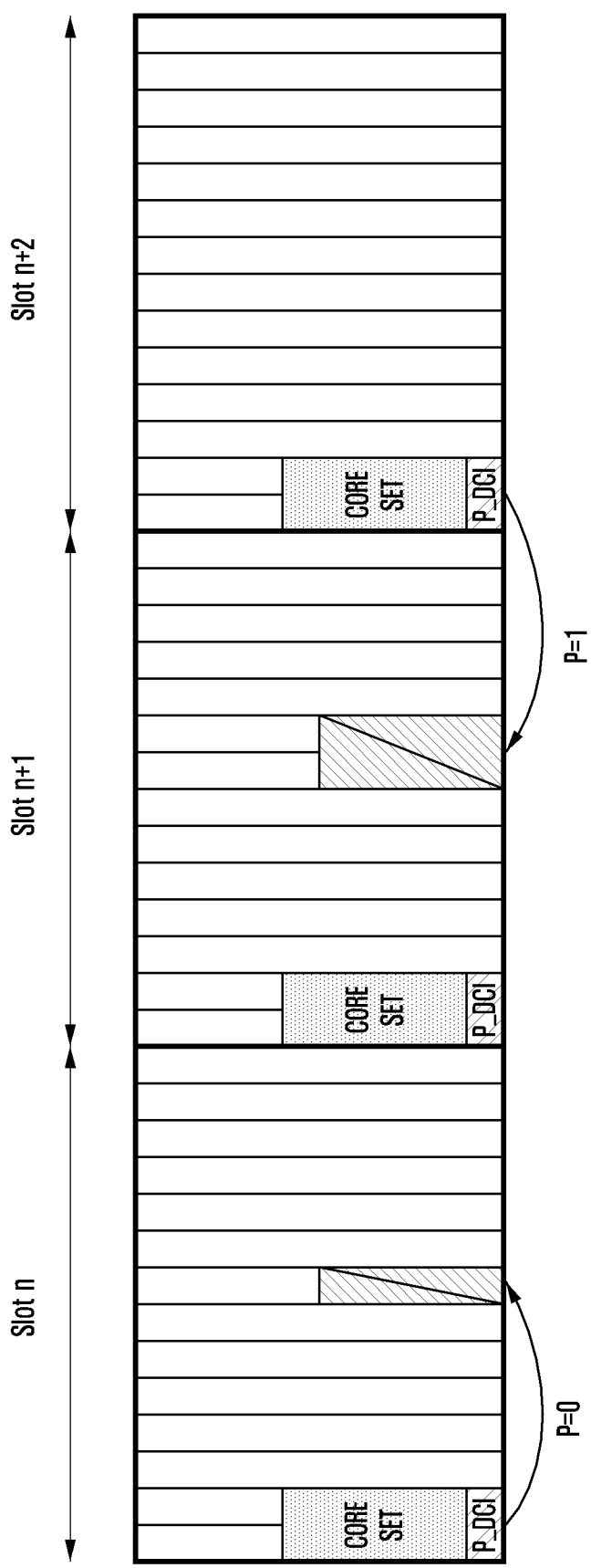
FIG. 12 illustrates an indication method according to an embodiment of the present disclosure.

FIG. 12 illustrates an indication method according to an embodiment of the present disclosure.

Referring to FIG. 12, the pre-emption indication can be for a group of UEs, for example, one or multiple eMBB UEs. The gNB/BS can inform a UE to monitor the pre-emption indication or not by RRC signaling. The pre-emption indication can be transmitted in a dedicated channel, or a normal PDCCH at pre-defined location. The indication can be addressed by a certain RNTI assigned by the gNB/BS. For example, it can be addressed by a skip-RNTI with a pre-defined or configured value.

In an embodiment of the present disclosure, the pre-emption indication or the skipping indication can be an RRC message or MAC CE included in DL MAC PDU or DCI in PDCCH or group common DCI in PDCCH. In an embodiment of the present disclosure, the group common DCI for the pre-emption indication or the skipping indication can be transmitted separately from group common DCI for slot format indication. In an embodiment of the present disclosure, the CORESET information for monitoring the group common DCI for the pre-emption indication or the skipping indication can be signaled in system information or in RRC signaling. In an embodiment of the present disclosure, the monitoring interval for monitoring the group common DCI for the pre-emption indication or the skipping indication can be signaled in system information or in RRC signaling.

The pre-emption indication transmitted in a time slot m, can be applied for the current time slot or the previous time slot, for example, m-P (P>=0). The information of P can be pre-defined as a fixed offset, or can be configured by the higher layer signaling. The exact value can be indicated from a set of pre-defined values, for example, {0, 1, 2, 3 . . . }. On the other hand, if the UE is scheduled in the n-th time slot, the UE assumes that there can be a pre-emption indication in the time slot n+P. If the UE fails to decode a downlink data transmission, it can decode one more time after receiving the pre-emption indication, for example, by puncturing the indicated pre-empted resources from the assigned resources. The value P can be explicitly indicated to a UE by dedicated signaling. The gNB/BS can configure different values of P to different UEs. This can be determined by UE capability. If the UE reports its capability related to the PDCCH blind decoding and physical downlink shared channel (PDSCH) processing, the gNB/BS can determine a proper P value considering UE's processing capability. In FIG. 12, the examples of P=0 and P=1 are shown to illustrate that a pre-emption indication can be for the current time slot (i.e., P=0), or can be for the previous time slot (i.e., P=1).

Figure 13:
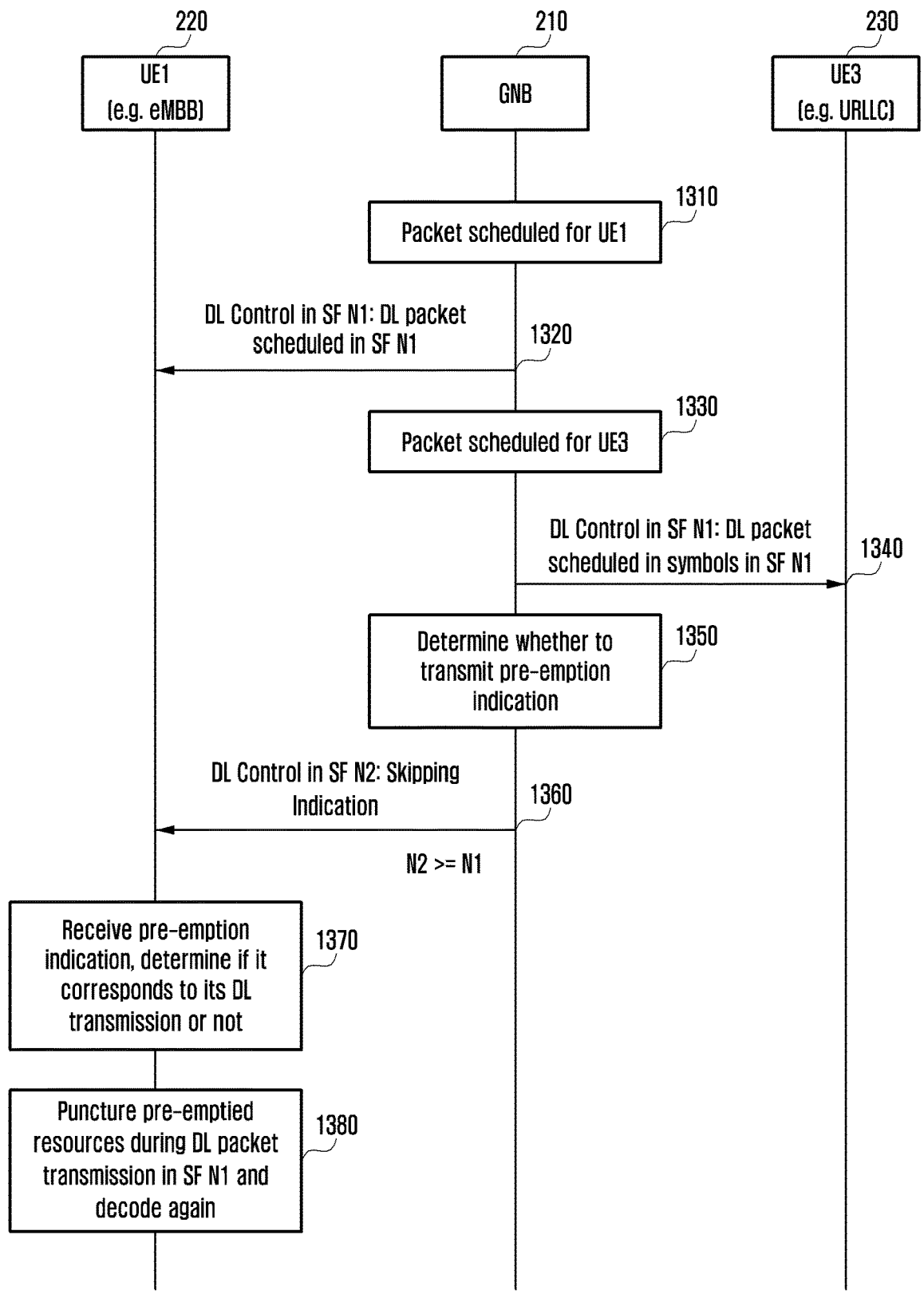
FIG. 13 illustrates a message flow between a UE and gNB/BS for collision handling in a case of dynamic scheduling according to an embodiment of the present disclosure.

FIG. 13 illustrates a message flow between a UE and gNB/BS for collision handling in a case of dynamic scheduling according to an embodiment of the present disclosure.

Referring to FIG. 13, at operation 1310, the gNB/BS 210 determines scheduling the UE1 220 for downlink eMBB packet transmission, and determines packet scheduling information for the UE1 220. At operation 1320, the UE1 220 is first scheduled an eMBB packet in subframe N1 by scheduling control information transmitted by the gNB/B S 210 in subframe N1.

And, at operation 1330, the gNB/BS 210 determines scheduling the UE3 230 for downlink URLLC packet transmission, and determines packet scheduling information for the UE3 230. At operation 1340, the UE3 230 is scheduled a URLLC packet in SF N1 by scheduling control information transmitted by the gNB/BS 210 in subframe N1.

At operation 1350, the gNB/BS 210 determines whether to transmit, to the UE1 220, the pre-emption indication or not. At operation 1360, the pre-emption indication s sent, from the gNB/BS 210 to the UE1 220, in subframe N2 where N2 is greater or equal to N1, if there is collision between eMBB packet scheduled to UE1 220 and the URLLC packet scheduled to the UE3 230.

If the pre-emption indication is received by UE1 220, then, at operation 1370, the UE1 220 determines whether the pre-emption indication 150 corresponds to its DL packet transmission or not. If the pre-emption indication 150 corresponds to its DL packet transmission, then the UE1 220 punctures pre-empted resources during DL packet transmission in subframe N1 and decode again at operation 1380.

Figure 14:
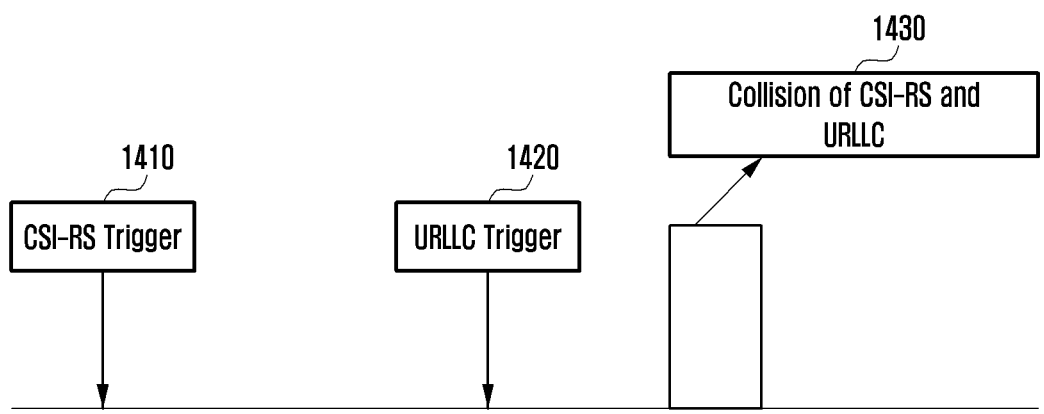
FIG. 14 illustrates an operation of handling collision between channel state information reference signal (CSI-RS) and ultra-reliable and low latency communication (URLLC) according to an embodiment of the present disclosure.

Collision Handling Between Channel State Information Reference Signal (CSI RS) and URLLC Transmissions FIG. 14 illustrates an operation of handling collision between CSI-RS and URLLC according to an embodiment of the present disclosure.

Referring to FIG. 14, to support low latency fast data scheduling is needed. As a result there can be collision between CSI-RS and URLLC transmission. 'P' is delay between CSI-RS trigger 1410 and transmission of CSI-RS 1430. 'Q' is delay between URLL trigger 1420 and transmission of URLLC packet 1410. In this case, the CSI-RS transmission is dropped and the URLLC packet is transmitted. The URLLC packet transmission is more urgent then the CSI-RS transmission. In an embodiment of the present disclosure, the CSI-RS transmission and the CSI-RS reporting can be re-triggered by the gNB/BS.

In a case of collision, the URLLC packet is transmitted instead of the CSI-RS, so the UE measuring the CSI-RS will have incorrect measurement and the CSI reporting will be not correct. When the CSI-RS is periodically transmitted and there is no measurement restriction, the UE can send the CSI report based on measurement of any CSI-RS transmission. Accordingly, the CSI report should be based on measurement of latest N CSI-RS transmissions. In an embodiment of the present disclosure, N can be one. Based on this gNB/BS will know whether the CSI report is correct or not as it know which the CSI-RS was collided. In an embodiment of the present disclosure, whether to apply the restriction or not can be signaled. It can also be implicit i.e., the UE applies if the URLLC is configured.

Figure 15:
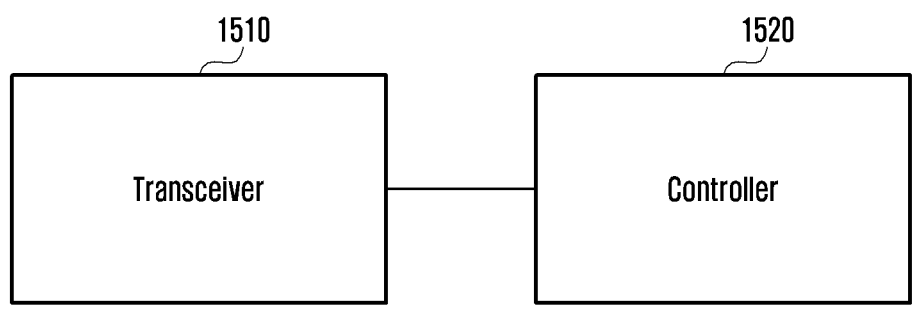
FIG. 15 is a block diagram of a user equipment according to an embodiment of the present disclosure.

FIG. 15 is a block diagram of a user equipment according to an embodiment of the present disclosure.

Referring to FIG. 15, the UE may include a transceiver 1510 and a controller 1520 to control the overall operation thereof.

The transceiver 1510 may transmit and receive signals to and from other network entities.

The controller 1520 may control the UE to perform a function according to one of the embodiments described before. For example, the controller 1520 may receive, from a base station, scheduling information for a first uplink packet transmission in a first time slot, determine whether the first uplink packet transmission in the first time slot is restricted based on information corresponding to a second uplink packet transmission in the first time slot of another terminal, and if the first uplink packet transmission in the first time slot is restricted, skip the first uplink packet transmission in a first time slot.

Although the controller 1520 and the transceiver 1510 are shown as separate entities, they may be realized as a single entity like a single chip. The controller 1520 and the transceiver 1510 may be electrically connected to each other.

The controller 1520 may be a circuit, an application-specific circuit, or at least one processor. The UE operations may be implemented using a memory unit storing corresponding program codes. Specifically, the UE may be equipped with a memory unit to store program codes implementing desired operations, and the controller 1520 may read and execute the program codes stored in the memory unit.

Figure 16:
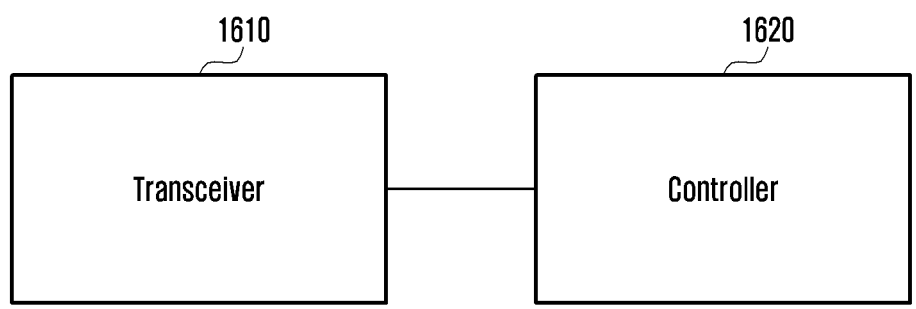
FIG. 16 is a block diagram of a base station according to an embodiment of the present disclosure.

FIG. 16 is a block diagram of a base station according to an embodiment of the present disclosure.

Referring to FIG. 16, the base station may include a transceiver 1610 and a controller 1620 to control the overall operation thereof.

The transceiver 1610 may transmit and receive signals to and from other network entities.

The controller 1620 may control the base station to perform a function according to one of the embodiments described before. For example, the controller 1620 may transmit, to a first terminal, first scheduling information for a first uplink packet transmission in a first time slot, transmit, to a second terminal, second scheduling information for a second uplink packet transmission in the first time slot, determine whether the first uplink packet transmission in the first time slot is restricted based on the second scheduling information, and if the first uplink packet transmission in the first time slot is restricted, receive, from the second terminal, the second uplink packet transmission in the first time slot.

Although the controller 1620 and the transceiver 1610 are shown as separate entities, they may be realized as a single entity like a single chip. The controller 1620 and the transceiver 1610 may be electrically connected to each other.

The controller 1620 may be a circuit, an application-specific circuit, or at least one processor. The base station operations may be implemented using a memory unit storing corresponding program codes. Specifically, the base station may be equipped with a memory unit to store program codes implementing desired operations, and the controller 1620 may read and execute the program codes stored in the memory unit.

It should be understood that schemes or methods and devices or components shown in FIGS. 1 to 16 are not intended to limit the scope of the present disclosure. It will also be apparent to those skilled in the art that the present disclosure may be practiced with only some of the aspects including components, entities, and operations described in FIGS. 1 to 16.

BS operations and UE operations described herein may be implemented using memory units storing corresponding program codes. Specifically, the BS or the UE may be equipped with a memory unit to store program codes implementing desired operations. To perform a desired operation, the controller of the BS or the UE may read and execute the program codes stored in the memory unit by using at least one processor or a central processing unit (CPU).

Various components and modules of the entity, base station or user equipment described in the specification may be implemented by use of hardware (such as complementary metal oxide semiconductor (CMOS) logic circuits), software, firmware (such as software stored in machine readable media), or a combination thereof. For example, various electrical structures and schemes may be realized by use of electric circuits, such as transistors, logic gates, and ASIC.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a wireless communication system, the method comprising:
  receiving, from a base station, a radio resource control (RRC) message including information on a pre-emption related radio network temporary identifier (RNTI) dedicated for monitoring a group common downlink control information (DCI) for a pre-emption indication, information on a control resource set (CORESET) for monitoring the group common DCI for the pre-emption indication, and an offset value related to the pre-emptive indication;
  receiving, from the base station, the pre-emption indication by monitoring the group common DCI in the CORESET based on the pre-emption related RNTI, wherein the pre-emption indication indicates an orthogonal frequency division multiplexing (OFDM) symbol and a physical resource block (PRB) of a resource to be used for an ultra-reliable and low latency communication (URLLC) transmission to another terminal, and the pre-emption indication received in a first slot is applied to a second slot which is previous from the first slot by the offset value; and
  identifying that no downlink transmission is intended for the terminal in the resource indicated by the pre-emption indication.

2. The method of claim 1, wherein a reception of a channel state information reference signal (CSI-RS) on the resource is interrupted for the URLLC transmission to the other terminal.

3. The method of claim 1, further comprising:
  receiving, from the base station, a channel state information reference signal (CSI-RS) on a resource configured from the base station except for the resource indicated by the pre-emption indication.

4. The method of claim 1, further comprising: identifying that uplink transmission scheduled in the resource indicated by the pre-emption indication is skipped.

5. A method performed by a base station in a wireless communication system, the method comprising:
  transmitting, to a terminal, a radio resource control (RRC) message including information on a pre-emption related radio network temporary identifier (RNTI) dedicated for monitoring a group common downlink control information (DCI) for a pre-emption indication, information on a control resource set (CORESET) for monitoring the group common DCI for the pre-emption indication, and an offset value related to the pre-emptive indication;

transmitting, to the terminal, the pre-emption indication by using the group common DCI in the CORESET based on the pre-emption related RNTI, wherein the pre-emption indication indicates an orthogonal frequency division multiplexing (OFDM) symbol and a physical resource block (PRB) of a resource to be used for an ultra-reliable and low latency communication (URLLC) transmission to another terminal, and the pre-emption indication transmitted in a first slot is applied to a second slot which is previous from the first slot by the offset value; and transmitting, to the other terminal, the URLLC transmission, by identifying that no downlink transmission is intended for the terminal in the resource indicated by the pre-emption indication.

6. The method of claim 5,
wherein a transmission of a channel state information reference signal (CSI-RS) on the resource is interrupted for the URLLC transmission to the other terminal.

7. The method of claim 5, further comprising:
transmitting, to the terminal, a channel state information reference signal (CSI-RS) on a resource configured from the base station except for the resource indicated by the pre-emption indication.

8. The method of claim 5, further comprising: identifying that uplink transmission scheduled in the resource indicated by the pre-emption indication is skipped.

9. A terminal in a wireless communication system, the terminal comprising:
a transceiver; and
at least one processor configured to:
receive, from a base station via the transceiver, a radio resource control (RRC) message including information on a pre-emption related radio network temporary identifier (RNTI) dedicated for monitoring a group common downlink control information (DCI) for a pre-emption indication, information on a control resource set (CORESET) for monitoring the group common DCI for the pre-emption indication, and an offset value related to the pre-emptive indication,
receive, from the base station via the transceiver, the pre-emption indication by monitoring the group common DCI in the CORESET based on the pre-emption related RNTI, wherein the pre-emption indication indicates an orthogonal frequency division multiplexing (OFDM) symbol and a physical resource block (PRB) of a resource to be used for an ultra-reliable and low latency communication (URLLC) transmission to another terminal, and the pre-emption indication received in a first slot is applied to a second slot which is previous from the first slot by the offset value, and
identify that no downlink transmission is intended for the terminal in the resource indicated by the pre-emption indication.

10. The terminal of claim 9, wherein a reception of a channel state information reference signal (CSI-RS) on the resource is interrupted for the URLLC transmission to the other terminal.

11. The terminal of claim 9, wherein the least one processor is further configured to:
receive, from the base station via the transceiver, a channel state information reference signal (CSI-RS) on a resource configured from the base station except for the resource indicated by the pre-emption indication.

12. The terminal of claim 9, wherein the at least one processor is further configured to:
identify that uplink transmission scheduled in the resource indicated by the pre-emption indication is skipped.

13. A base station in a wireless communication system, the base station comprising:
a transceiver; and
at least one processor configured to:
transmit, to a terminal via the transceiver, a radio resource control (RRC) message including information on a pre-emption related radio network temporary identifier (RNTI) dedicated for monitoring a group common downlink control information (DCI) for a pre-emption indication, information on a control resource set (CORESET) for monitoring the group common DCI for the pre-emption indication, and an offset value related to the pre-emptive indication,
transmit, to the terminal via the transceiver, the pre-emption indication by using the group common DCI in the CORESET based on the pre-emption related RNTI, wherein the pre-emption indication indicates an orthogonal frequency division multiplexing (OFDM) symbol and a physical resource block (PRB) of a resource to be used for an ultra-reliable and low latency communication (URLLC) transmission to another terminal, and the pre-emption indication transmitted in a first slot is applied to a second slot which is previous from the first slot by the offset value, and
transmit, to the other terminal, the URLLC transmission, by identifying that no downlink transmission is intended for the terminal in the resource indicated by the pre-emption indication.

14. The base station of claim 13, wherein a transmission of a channel state information reference signal (CSI-RS) on the resource is interrupted for the URLLC transmission to the other terminal.

15. The base station of claim 13, wherein the least one processor is further configured to:
transmit, to the terminal via the transceiver, a channel state information reference signal (CSI-RS) on a resource configured from the base station except for the resource indicated by the pre-emption indication.

16. The base station of claim 13, wherein the at least one processor is further configured to:
identify that uplink transmission scheduled in the resource indicated by the pre-emption indication is skipped.

\* \* \* \* \*